UNITED STATES PATENT OFFICE.

CHARLES GLASER, OF BALTIMORE, MARYLAND, ASSIGNOR TO THE AMERICAN PHOSPHATE AND CHEMICAL COMPANY, OF SAME PLACE.

PROCESS OF MAKING PHOSPHORIC ACID.

SPECIFICATION forming part of Letters Patent No. 459,575, dated September 15, 1891.

Application filed March 9, 1891. Serial No. 384,348. (No specimens.)

*To all whom it may concern:*

Be it known that I, CHARLES GLASER, a citizen of the United States, residing at Baltimore, in the State of Maryland, have invented certain new and useful Improvements in the Process of Manufacturing Phosphoric Acid from Phosphatic Material; and I do hereby declare the following to be a full, clear, and exact description of the invention, such as will enable others skilled in the art to which it appertains to make and use the same.

This invention relates to an improvement in the process for manufacturing phosphoric acid out of phosphorites or other phosphatic material.

The ordinary and known process consists of two main steps: first, treating the phosphatic material with dilute sulphuric acid, obtaining a weak solution of phosphoric acid, and, second, concentrating this solution (after separation) by evaporation.

My improvement consists in the following modification of the above process: Having obtained the weak phosphoric acid in the ordinary way, I use this instead of water to dilute sulphuric acid and treat a new charge of phosphatic material with sulphuric acid so diluted. Separating the solution obtained by this treatment, I have in it phosphoric acid of greater strength than that first obtained. Using this stronger phosphoric acid as a diluent, I repeat the process on a new charge of phosphatic material, with the result of again enriching the phosphoric acid. Having repeated this process as often as may be found convenient and practically advantageous, each time using the last-obtained phosphoric acid as a diluent and having thus obtained without evaporation phosphoric acid of much greater strength than can be so obtained in the ordinary way, I proceed to complete its concentration by the usual process of evaporation.

The advantages gained by this improvement are as follows: Fuel is saved by effecting a large part of the concentration without evaporation. There is less sulphate of lime in solution to be separated in the evaporating process, because the diluent phosphoric acid does not dissolve it as water does. There appears, also, to be an advantage in the more perfect decomposition effected by this mixture of acids, rendering an excess of sulphuric acid less necessary.

To illustrate my process I will now give the following example, (a knowledge of the usual process being presumed:) Having sulphuric acid of, say, 50° Baumé, I dilute this with water to, say, 15°, and with a sufficient amount of this weak acid, I treat in usual manner a charge of phosphorite in a vat which I will call "A." Then by filtering I obtain from this phosphoric acid of about 10° Baumé, and also the washings of the filtrate, which I keep separate. Taking the same amount of strong sulphuric acid as before, I dilute this with the phosphoric acid just obtained, using the same volume of said acid as I used of water before. (Any deficiency may be made up with the reserved washings.) With this so-diluted acid I treat in like manner as before a like charge of phosphorite in another vat, which I will call "B." Filtering the contents of this, I obtain acid of about 20° Baumé, and also washings of the filtrate, which will be richer than before. Again taking strong sulphuric acid and diluting it in like manner with the phosphoric acid last obtained, I treat with it a like charge of phosphorite in a third vat "C." Filtering the contents of this vat, I get phosphoric acid of about 30° Baumé, besides the washings. The acid may be further enriched by repeating the process described, but beyond the point now reached—about 30° Baumé—filtration will be difficult, and I therefore proceed to complete the concentration by evaporation in the usual way.

In the foregoing the processes of the three vats A, B, and C are described as consecutive; but it is to be understood that after starting the three processes may be in simultaneous operation, each process being indefinitely repeated in the vat appropriated to it. Again, the arrangement is described above as for three vats and digesting processes. The number may be increased or diminished with some advantages, according to circumstances.

The washings of the filters will be of various degrees of richness. They should be kept separate, accordingly, that they may be used, by addition to the solvents or otherwise, to the greatest advantage.

What I claim is—

As a new and useful improvement in the art of manufacturing phosphoric acid, first diluting sulphuric acid with phosphoric acid, (instead of with water,) and then treating successive charges of phosphatic material with sulphuric acid diluted with phosphoric acid of increasing degrees by the system of applying the phosphoric acid derived from each charge as a diluent to the sulphuric acid used in treating the succeeding charge, substantially as hereinbefore described.

In testimony whereof I affix my signature in presence of two witnesses.

CHARLES GLASER.

Witnesses:
L. K. SPARROW,
W. ADDISON BAKER.